(12) United States Patent
Hollis et al.

(10) Patent No.: US 7,129,956 B2
(45) Date of Patent: Oct. 31, 2006

(54) VARIABLE BIT FIELD COLOR ENCODING

(75) Inventors: Martin Hollis, Cambridge (GB);
Anthony P. DeLaurier, Sunnyvale, CA (US); Farhad Fouladi, Los Altos Hills, CA (US)

(73) Assignee: Nintendo Co., Ltd., Kyoto (JP)

( * ) Notice: Subject to any disclaimer, the term of this patent is extended or adjusted under 35 U.S.C. 154(b) by 208 days.

(21) Appl. No.: 10/394,222

(22) Filed: Mar. 24, 2003

(65) Prior Publication Data

US 2003/0184556 A1   Oct. 2, 2003

Related U.S. Application Data

(62) Division of application No. 09/585,329, filed on Jun. 2, 2000.

(51) Int. Cl.
*G09G 5/02* (2006.01)
*G09G 5/00* (2006.01)

(52) U.S. Cl. .................. 345/592; 345/582; 345/605

(58) Field of Classification Search ............. 345/582, 345/589, 592, 611, 513, 441, 605
See application file for complete search history.

(56) References Cited

U.S. PATENT DOCUMENTS

| | | |
|---|---|---|
| 4,388,620 A | 6/1983 | Sherman |
| 4,425,559 A | 1/1984 | Sherman |
| 4,570,233 A | 2/1986 | Yan et al. |
| 4,658,247 A | 4/1987 | Gharachorloo |
| 4,725,831 A | 2/1988 | Coleman |
| 4,829,295 A | 5/1989 | Hiroyuki |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,918,625 A | 4/1990 | Yan |
| 4,945,500 A | 7/1990 | Deering |
| 5,136,664 A | 8/1992 | Bersack et al. |
| 5,170,468 A | 12/1992 | Shah et al. |
| 5,392,385 A | 2/1995 | Evangelisti et al. |
| 5,392,393 A | 2/1995 | Deering |
| 5,416,606 A | 5/1995 | Katayama et al. |

(Continued)

FOREIGN PATENT DOCUMENTS

CA   2070934   12/1993

(Continued)

OTHER PUBLICATIONS

Rogers, Doug, "Color Key in Direct3D," White Papers, www.nvidia.com, posted Jan. 11, 2000.

(Continued)

*Primary Examiner*—Matthew C. Bella
*Assistant Examiner*—Aaron M. Richer
(74) *Attorney, Agent, or Firm*—Nixon & Vanderhye P.C.

(57) ABSTRACT

A compact image element encoding format selectively allocates a bit field within the format to alternately encode either multi-bit alpha resolution or increased color resolution. This encoding technique may be advantageously used to allocate encoding bits to model semi-transparency while using those same bits for other purposes (e.g., higher color resolution) in instances where semi-transparency is not required (e.g., for opaque image elements). In one advantageous embodiment, the same encoding format can provide either RGB5 or RGB4A3, on an image-element-by-image-element basis. Applications include but are not limited to texture mapping in a 3D computer graphics system such as a home video game system or a personal computer.

7 Claims, 10 Drawing Sheets
(3 of 10 Drawing Sheet(s) Filed in Color)

U.S. PATENT DOCUMENTS

| | | | |
|---|---|---|---|
| 5,421,028 A | 5/1995 | Swanson | |
| 5,457,775 A | 10/1995 | Johnson, Jr. et al. | |
| 5,495,563 A | 2/1996 | Winser | |
| 5,504,917 A | 4/1996 | Austin | |
| 5,594,854 A | 1/1997 | Baldwin et al. | |
| 5,606,650 A | 2/1997 | Kelley et al. | |
| 5,608,424 A | 3/1997 | Takahashi et al. | |
| 5,687,357 A | 11/1997 | Priem | |
| 5,701,444 A | 12/1997 | Baldwin | |
| 5,721,947 A | 2/1998 | Priem et al. | |
| 5,727,192 A | 3/1998 | Baldwin | |
| 5,758,182 A | 5/1998 | Rosenthal et al. | |
| 5,764,243 A | 6/1998 | Baldwin | |
| 5,767,858 A | 6/1998 | Kawase et al. | |
| 5,768,626 A | 6/1998 | Munson et al. | |
| 5,768,629 A | 6/1998 | Wise et al. | |
| 5,774,133 A | 6/1998 | Neave et al. | |
| 5,777,629 A | 7/1998 | Baldwin | |
| 5,798,770 A | 8/1998 | Baldwin | |
| 5,801,706 A | 9/1998 | Fujita et al. | |
| 5,801,716 A | 9/1998 | Silverbrook | |
| 5,805,175 A | 9/1998 | Priem | |
| 5,805,868 A | 9/1998 | Murphy | |
| 5,815,166 A | 9/1998 | Baldwin | |
| 5,821,949 A | 10/1998 | Deering | |
| 5,874,969 A | 2/1999 | Storm et al. | |
| 5,880,737 A | 3/1999 | Griffen et al. | |
| 5,886,705 A | 3/1999 | Lentz | |
| 5,894,300 A | 4/1999 | Takizawa | |
| 5,914,725 A * | 6/1999 | MacInnis et al. | 345/441 |
| 5,917,496 A | 6/1999 | Fujita et al. | |
| 5,920,326 A | 7/1999 | Rentschler et al. | |
| 5,940,086 A | 8/1999 | Rentschler et al. | |
| 5,949,424 A | 9/1999 | Cabral et al. | |
| 5,949,440 A | 9/1999 | Krech, Jr. et al. | |
| 5,969,726 A | 10/1999 | Rentschler et al. | |
| 5,986,663 A | 11/1999 | Wilde | |
| 5,999,196 A | 12/1999 | Storm et al. | |
| 6,002,409 A | 12/1999 | Harkin | |
| 6,002,410 A * | 12/1999 | Battle | 345/552 |
| 6,005,583 A | 12/1999 | Morrison | |
| 6,005,584 A | 12/1999 | Kitamura et al. | |
| 6,016,150 A | 1/2000 | Lengyel et al. | |
| 6,023,738 A | 2/2000 | Priem et al. | |
| 6,025,853 A | 2/2000 | Baldwin | |
| 6,028,611 A | 2/2000 | Anderson et al. | |
| 6,037,949 A | 3/2000 | DeRose et al. | |
| 6,054,993 A | 4/2000 | Devic et al. | |
| 6,057,852 A | 5/2000 | Krech, Jr. | |
| 6,092,124 A | 7/2000 | Priem et al. | |
| 6,173,367 B1 | 1/2001 | Aleksic et al. | |
| 6,181,352 B1 | 1/2001 | Kirk et al. | |
| 6,198,488 B1 | 3/2001 | Lindholm et al. | |
| 6,226,012 B1 | 5/2001 | Priem et al. | |
| 6,339,428 B1 * | 1/2002 | Fowler et al. | 345/582 |

FOREIGN PATENT DOCUMENTS

| | | |
|---|---|---|
| EP | 1 074 945 | 2/2001 |
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W-Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.

VisionTek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, ©1999.

Nikkei Shimbun, "Sony Making SME, Chemical and SPT into Wholly-Owned Subsidiaries", Mar. 9, 1999.

AM News: Japanese Developers Not All Sold on PS2, Next Generation, Mar. 16, 1999.

Sony To Turn PlayStation Maker into Wholly Owned Unit-Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment, Inc., ©1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug., 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second-Depth Shadow Mapping", Department of Computer Science, Univ. N.C, Chapel Hill, N.C. pp. 1-7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov., 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994,pp. 433-437.
James F. Blinn, "Simulationof Wrinkled Surfaces," Caltech/JPL, pp. 286-292, SIGGRAPH 78 (1978).
Tomas Möller and Eric Haines, "Real-Time Rendering", AK Peters, Ltd., ©1999, pp. 127-142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump-mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump-mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000,www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per-Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999, www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation, 1995-1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision-Wesley Publishing Co., 1993.
"Procedural Elements for Computer Graphics," Second Edition, David F. Rogers, McGraw Hill,1998.
"Real-Time Rendering," Tomas Molleir, Eric Haines, AK Peters, 1999.
"Computer Graphics, Principles and Practice," Second Edition, The Systems Programming Series, Foley, van Dam, Fiener, Hughes, Addison Wesley, 1990.
"Principles of Three-Dimensional Computer Animation", Revised Edition, Michael O'Rourke, W.W. Norton & Company, 1998.
ZDNet Reviews, from *PC Magazine*, "Other Enhancements," Jan. 15, 1999, wysiwgy://16http://www4.zdnet.com...ies/reviews/0.4161.2188286.00.html.
ZDNet Reviews, from *PC Magazine*, "Screen Shot of Alpha-channel Transparency," Jan. 15, 1999, wysiwyg://16http://www.4zdnet.com...ies/reviews/0.4161.2188286.00.hmtl.
Alpha (transparency) Effects, Future Technology Research Index, http://www.futuretech.vuurwerk.n1/alpha.html.
Blythe, David, 5.6 Transparency Mapping and Trimming with Alpha, http://toolbox.sgi.com/TasteOfOT/d...penGL/advanced98/notes/node41.html, Jun. 11, 1998.
10.2 Alpha Blending, http://www.sgi.com/software/opengl/advanced98/notes/node146.html.
10.3 Sorting, http://www.sgi.com/software/opengl/advanced98/notes/node147.html.
10.4 Using the Alpha Function, http://www.sgi.com/software/opengl/advanced98/notes/node148.hmtl.
Winner, Stephanie, et al., "Hardware Accelerated Rendering Of Antialiasing Using A Modified A-buffer Algorithm," Computer Graphics Proceedings, Annual Conference Series, 1997, pp. 307-316.

* cited by examiner

Fig. 1(a) Original texture

Fig. 1(b) Texture with one bit alpha

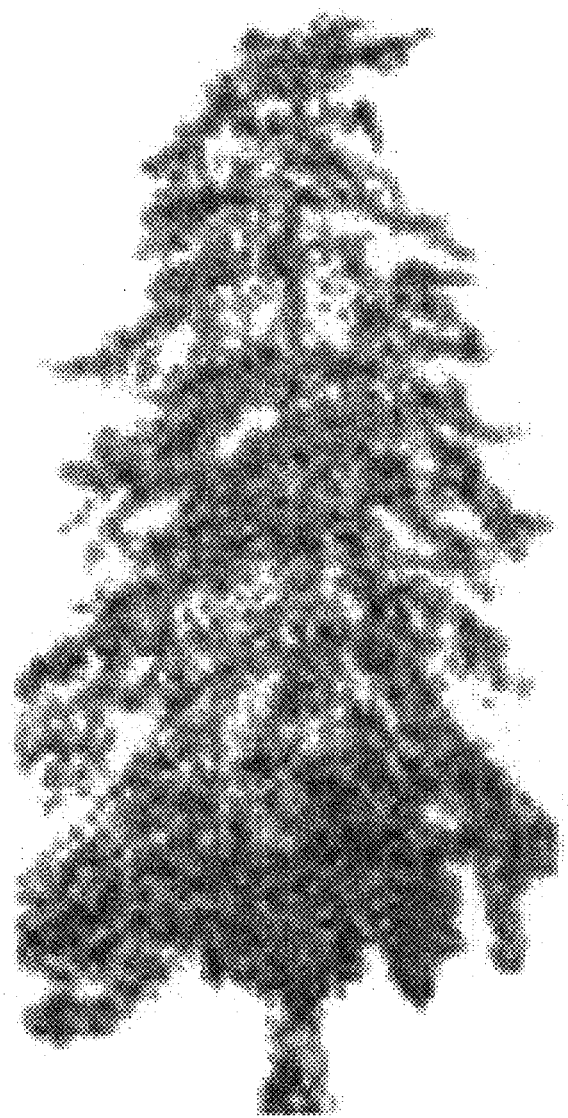
Fig. 1(c) Texture with multiple bit alpha

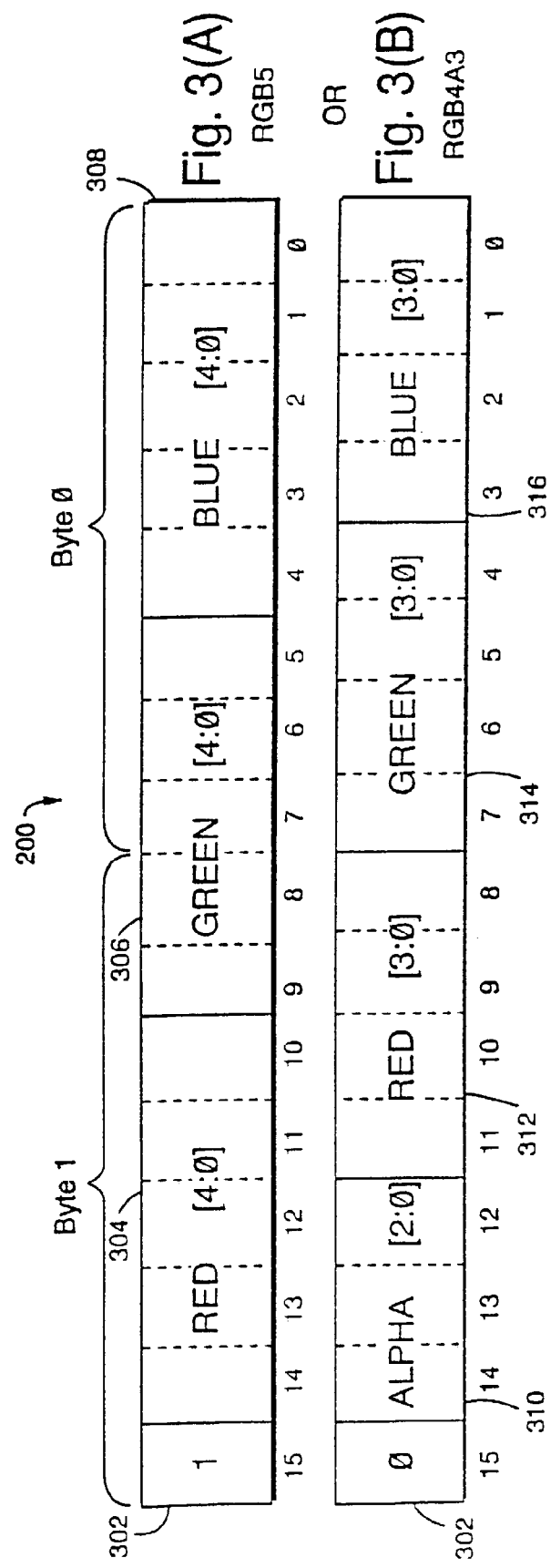

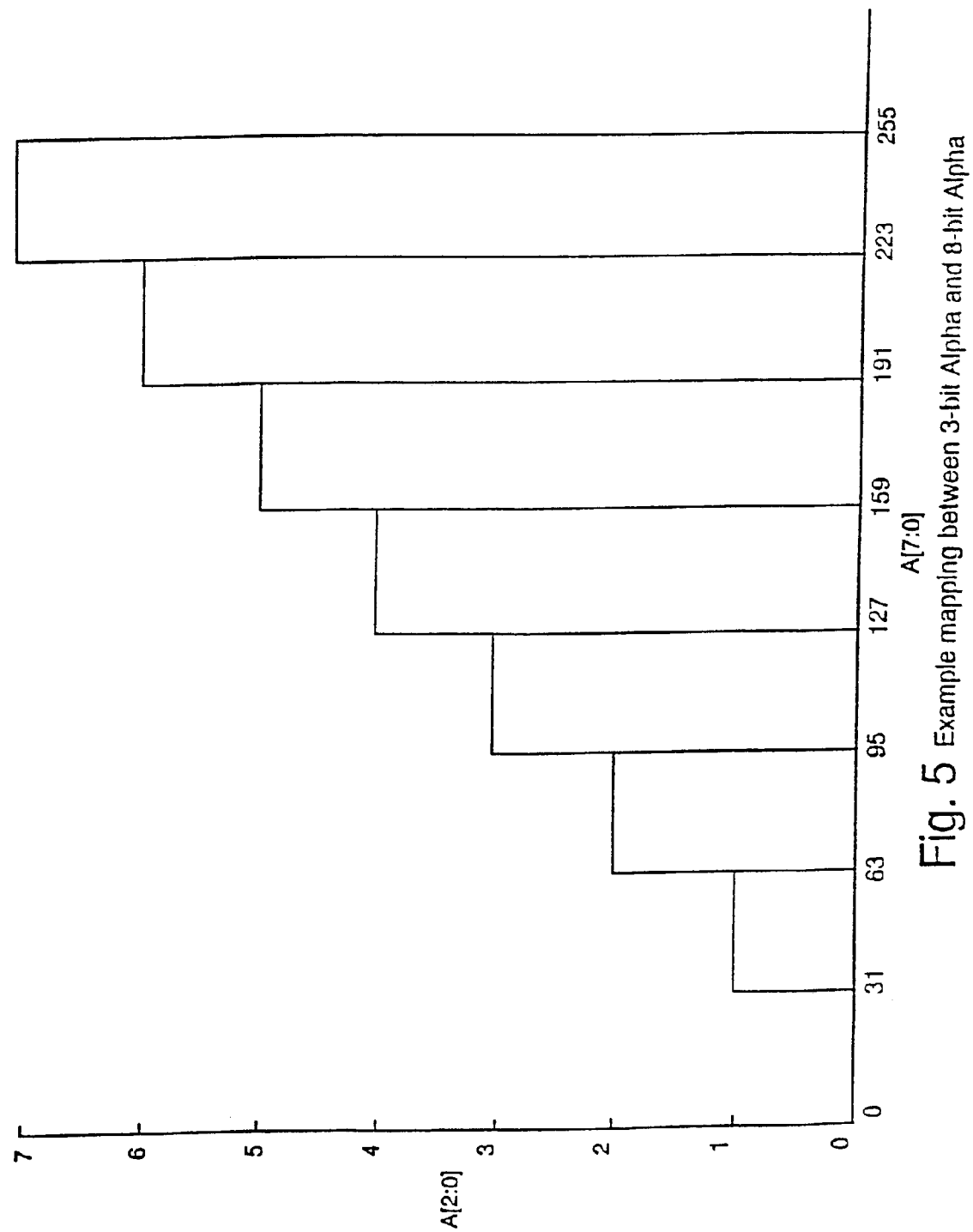
Fig. 5 Example mapping between 3-bit Alpha and 8-bit Alpha

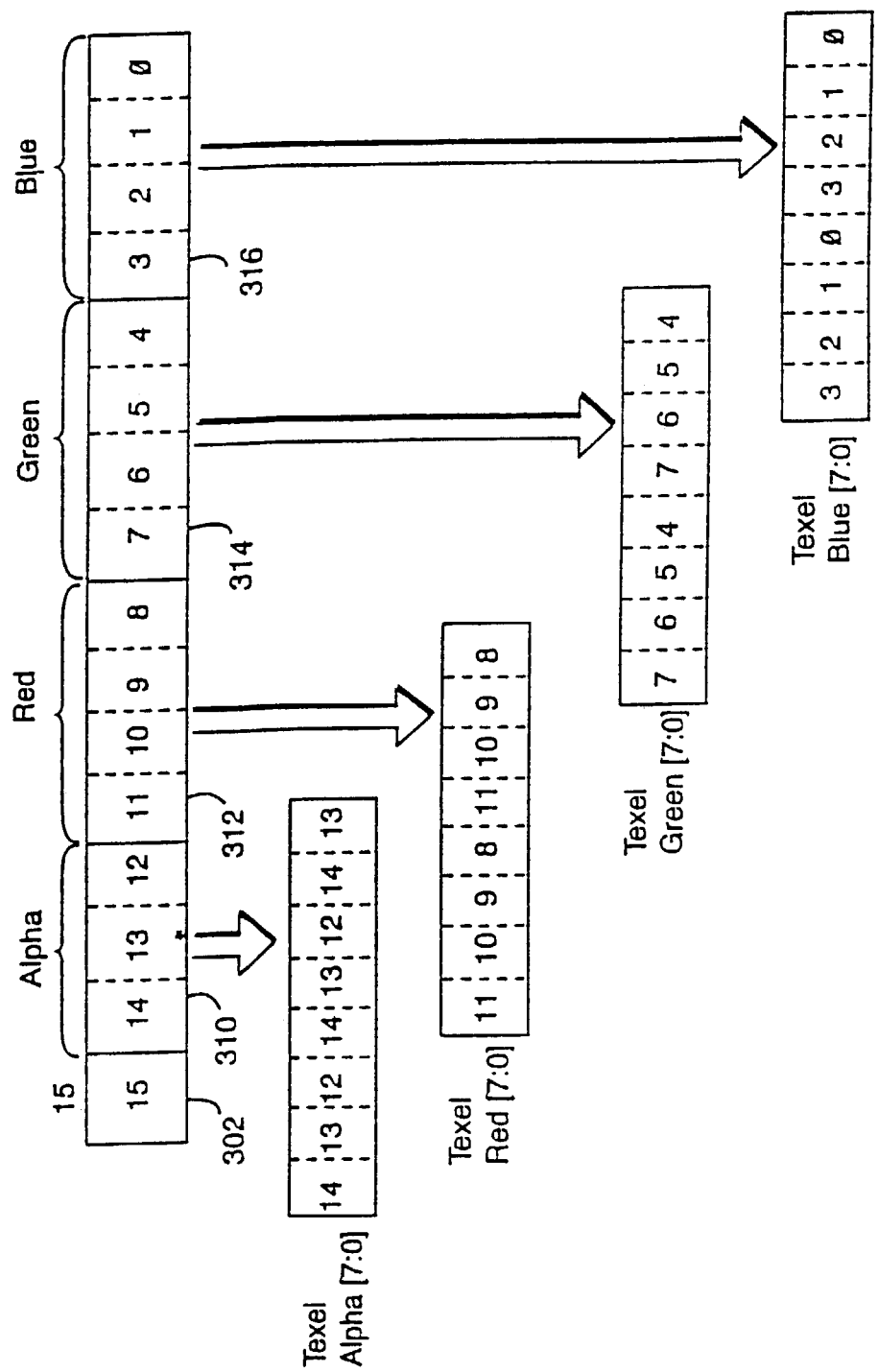
Fig. 6 Example Texel Component Extraction Multiplexing

VARIABLE BIT FIELD COLOR ENCODING

CROSS-REFERENCE TO RELATED APPLICATION

This application is a division of application Ser. No. 09/585,329 filed Jun. 2, 2000, pending, the entire content of which is hereby incorporated by reference into this application.

FIELD OF THE INVENTION

This invention relates to computer graphics, and more particularly, to efficiently representing color image elements such as texels. Still more particularly, the invention relates to a color image encoding format and associated encoding mode that provides higher resolution color information, or lower resolution color information and semi-transparency information.

BACKGROUND AND SUMMARY OF THE INVENTION

Many of us have seen films containing remarkably realistic dinosaurs, aliens, animated toys and other fanciful creatures. Such animations are made possible by 3D computer graphics. A computer is used to model objects in three dimensions, and to display them on a screen such as your home television or computer screen. An artist can completely specify how each object will look as well as how it will change in appearance over time. The computer takes care of performing the many millions of tasks required to make sure that each part of the moving image is colored just right based on how far away it is, the direction in which light strikes each of the many objects in the scene, the surface texture of each object, and many other factors.

Because of the complexity of the 3D graphics generation process, just a few years ago computer-generated three-dimensional graphics was mostly limited to expensive specialized flight simulators, graphics workstations or supercomputers. The public saw the results of computer generated 3D graphics in movies and advertisements, but never actually interacted with the computers doing the 3D graphics generation. All that has changed with the availability of relatively inexpensive 3D graphics platforms such as the Nintendo 64® and various 3D graphics cards available for personal computers. It is now possible to produce exciting 3D animations and simulations interactively in real time on relatively inexpensive computer graphics systems in your home or office.

One goal of computer graphics is to provide the capability for a high degree of visual realism. This means that the computer ought to be able to model objects so they have visible characteristics just like real objects in the physical world. For example, to enable realistic lighting effects such as reflection, the computer should keep track of which objects have shiny surfaces and which objects have dull surfaces. Another important characteristic the computer should be able to model is how opaque or transparent an object is. The computer should allow you to see through transparent objects such as windows, but not through opaque objects such as stone walls.

Many computer graphics system model the opacity (transparency) of surfaces using a technique called "alpha blending." Using this conventional technique, each image element is assigned an "alpha value" representing its degree of opacity. The colors of the image element are blended based on the alpha value—allowing one object to appear to be visible through another object. A further conventional technique called "alpha function" or "alpha test" can be used to discard an object fragment based on comparing the fragment's alpha value with a reference function or value. Alpha test may decide to not blend (i.e., to throw away) a potential part of an image because it is transparent and will therefore be invisible.

Alpha blending and alpha test are especially useful for modeling transparent objects such as water and glass. This same functionality can also be used with texture mapping to achieve a variety of effects. For example, the alpha test is frequently used to draw complicated geometry using texture maps on polygons—with the alpha component acting as a matte. By way of illustration, a tree can be drawn as a picture (texture) of a tree on a polygon. The tree parts of the texture image can have an alpha value of 1 (opaque), and the non-tree parts can have an alpha value of 0 (transparent). In this way, the "non-tree" parts of the polygons are mapped to invisible (transparent) portions of the texture map, while the "tree" portions of the polygon are mapped to visible (opaque) portions of the texture map.

The alpha component of a texture can be used in other ways—for example, to cut holes or trim surfaces. As one example, an image of a cutout or a trim region can be stored in a texture map. When mapping the texture to the polygon surface, alpha testing or blending can be used to cut the cutout or trimmed region out of the polygon's surface.

One interesting issue relates to the amount of alpha information that should be provided. In the real world, many objects are not completely transparent or completely opaque, but actually fall somewhere in between. For example, you can't see through etched glass, but you can see some light shine through it. Etched glass is an example of an object that is neither entirely transparent or entirely opaque, but is instead semi-transparent or "translucent." Even objects we typically think of as being very transparent may not be entirely so but may instead be only semi-transparent. For example, pond water is relatively clear, but may have some cloudiness to it. You can see a certain distance through pond water, but it becomes increasingly opaque based on depth. Clouds, smoke and imaginary ghosts are other examples of semi-transparent objects you might want to model using a computer graphics system.

To model such semi-transparent objects, computer graphics systems in the past have used multi-bit alpha values that encode not just "opaque" and "transparent," but also varying degrees of semi-transparency. However, additional memory is needed to store an alpha component for each image element. The amount of additional memory required depends on the size of the image (i.e., the number of image elements) and the amount of alpha information to be stored for each image element. Storing multi-bit alpha components for each of thousands of image elements can substantially increase the amount of memory required. Even in systems with lots of memory, it may be desirable for performance reasons (i.e., reduced memory access time) to minimize the amount of memory required to store a given image.

To avoid locking application developers to a particular set of memory requirements and/or memory access times, one approach used in the past was to make the image element encoding mode of the computer graphics system programmable. Under this approach, the programmer could select between different color encoding modes as dictated by the characteristics of the particular image being generated at the time. For example, some systems allowed the programmer to choose between single-word and double-word color encoding formats. The programmer could choose a single-word RGB format for images requiring lower color resolution and no transparency capabilities, or a double-word RGBA format for images requiring higher color resolution and transparency. Speed performance might suffer somewhat if the double-word format were selected (since two words instead of one need to be accessed for each image element), but this tradeoff might be worth it to enable more complex or interesting images to be generated.

While the approach of selecting between single-word RGB format and double-word RGBA format is very useful, it also has certain significant limitations. For example, in resource-constrained 3-D graphics systems such as 3-D home video games, it may be especially important as a practical matter to conserve memory usage and associated memory access time. This might mean, for example, that in the context of a real time interactive game, the programmer may rarely (if ever) have the luxury of activating the double-word RGBA mode because of memory space or speed performance considerations. In other words, even when using a system that provides an alpha mode, the game programmer may sometimes be unable to take advantage of it without degrading image complexity (e.g., number of textures) and/or speed performance.

One past proposed solution to this problem was to allocate a single bit of a single-word RGB color format for transparency. For example, if word length is 16 bits, five bits can be allocated to each of the three primary colors (red, green and blue)—and the extra bit could be used for transparency (alpha). While this approach is certainly useful in terms of very efficient use of available memory, it has the limitation of providing only a binary (on/off) alpha value (i.e., either transparent or opaque). This prior approach therefore cannot provide visual effects requiring more alpha resolution (semi-transparency).

By way of further explanation, along edges of cutouts, trim regions, and certain texture mapped images, it may be desirable to provide an alpha component value that lies somewhere between transparent and opaque. This capability can (coupled with conventional anti-aliasing techniques) smooth and soften transitions to increase realism. For example, in the real world, the edge(s) surrounding a cutout might not be an entirely sharp transition, but may instead have some smooth transition. Alpha blending based on a range of alpha components modeling semi-transparency coupled with anti-aliasing (which smoothes out the "jaggies" in a digitally stepped surface) can be used to effectively model natural edge rounding. But this technique requires the ability to model semi-transparency, and does not work well if the alpha component is limited to a single "on/off" value.

FIGS. 1(a) and 1(b) help to illustrate this. FIG. 1(a) shows an original texture of a tree on a black background. FIG. 1(b) shows this same texture with one bit of alpha resolution. A one-bit alpha texture appears unnatural around the edges. This is a problem when the texture appears in front of any other objects, or indeed when the background to the texture is anything other than plain black. The texture is pictured here on a plain white background.

We have realized that for many of the visual effects we wish to present in the context of video games and other 3D interactive applications, we want to be able to provide more than a single "on/off" (i.e., opaque or transparent) value, but we may not need a "full" resolution alpha component to accomplish our objectives. For example, to provide smooth anti-aliased edges on cutouts, we may not need full 8-bit alpha resolution to provide visually pleasing effects. Some type of reduced resolution alpha encoding for semi-transparency (e.g., two or three bits of alpha to encode transparent, opaque, and two or six intermediate semi-transparency values) may be sufficient.

FIG. 1(c) helps to illustrate this. FIG. 1(c) shows the same tree texture as FIGS. 1(a) and 1(b), but using a multiple bit alpha value. The texture is pictured here on a plain white background. A multiple-bit alpha texture appears far smoother around the edges, whatever is behind it.

The present invention takes advantage of this observation by providing, in one particular implementation, a compact image element encoding format that selectively allocates bits on an element-by-element basis to encode multi-bit alpha resolution. This technique may be advantageously used to allocate encoding bits within some image elements for modeling semi-transparency while using those same bits for other purposes (e.g., higher color resolution) in other image elements not requiring a semi-transparency value (e.g., for opaque image elements). Applications include but are not limited to texture mapping in a 3D computer graphics system such as a home video game system or a personal computer.

In accordance with one aspect of the invention, a stored data element format representing a portion of an image includes a multi-bit alpha component field that may or may not be present in a particular instance of said format. The format includes a further portion encoding at least one color component. This portion has a first length if said multi-bit alpha component field is present, and has a second length greater than said first length if said multi-bit alpha component field is not present.

In accordance with another aspect of the invention, a texture map includes a first texel encoded with a semi-transparency value and having first color resolution; and a second texel encoded without any semi-transparency value and having second color resolution greater than the first color resolution.

In accordance with a further aspect of the invention, a color image element encoding format comprises an indicator field indicating whether an instance of said format is capable of encoding semi-transparency. The format further includes at least one variable sized field encoding further information concerning the color image element. The at least one variable sized field has a first length if the indicator field indicates the format instance is incapable of encoding semi-transparency, and has a second length less than the first length if the indicator field indicates the format instance is capable of encoding semi-transparency.

In accordance with a further aspect of the invention, an image element encoding format includes a flag or other indicator that indicates whether the element has an associated a multi-bit alpha component. If the flag indicates that no alpha value is present, then the encoding format stores higher-resolution color information (e.g., five bits each of red, green and blue color information in one particular example). If, on the other hand, the indicator indicates that an alpha component is present, then the image element's color resolution is reduced (e.g., to four bits each of red, green and blue color information in one particular example), and the remaining bits are used to provide a multi-bit field to encode semi-transparency alpha information.

The present invention also provides a method of encoding an image element comprising specifying whether said image element will encode semi-transparency. If the specifying step specifies that said image element will encode semi-transparency, a set of plural bits within an encoding format is allocated to encode alpha. If the specifying step specifies that the image element will not encode semi-transparency, the set of plural bits is allocated to encode another characteristic of the image element (e.g., increased color resolution).

The present invention further provides an alpha component converter that converts between first and second resolutions of semi-transparency information, the converter quantizing or dequantizing first resolution semi-transparency information into a predetermined number of equal sized steps to form second resolution semi-transparency information.

The ability to vary the bit encoding format on an image-element-by-image-element basis provides the potential for enhanced image quality by, for example, increasing the color resolution of those image elements not needing an alpha component. Opaque image elements can use the bits that may otherwise be used for alpha encoding to achieve higher color resolution.

The variable bit field color encoding technique provided by the present invention is especially useful in encoding texture elements (texels) within a 3D graphics system. Such variable bit field color encoding can be used, for example, to provide a texture element multi-bit alpha component that allows smooth anti-aliased edges on cutouts and in other instances where semi-transparency encoding is useful, without requiring the programmer to invoke a double-precision color encoding mode for all image elements with resulting doubling of the total amount of storage space required. Furthermore, this technique can be used to preserve higher color resolution across most of an image while degrading it only locally in small image areas where semi-transparency is required. The loss of color resolution may not be noticeable in such small semi-transparent image areas.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

These and other features and advantages may be better and more completely understood by referring to the following detailed description of presently preferred example embodiments in conjunction with the drawings, of which:

FIG. 1(a) shows an example texture on a black background;

FIG. 1(b) shows the FIG. 1(a) texture with one bit alpha;

FIG. 1(c) shows the FIG. 1(a) texture with multi-bit alpha against a white background;

FIGS. 3A and 3B show an example variable bit encoding format;

FIG. 5 shows an example mapping between reduced and higher resolution alpha encodings; and FIG. 6 shows an example texel component extraction multiplexing.

DETAILED DESCRIPTION OF PRESENTLY PREFERRED EXAMPLE EMBODIMENTS

Figure 2A:
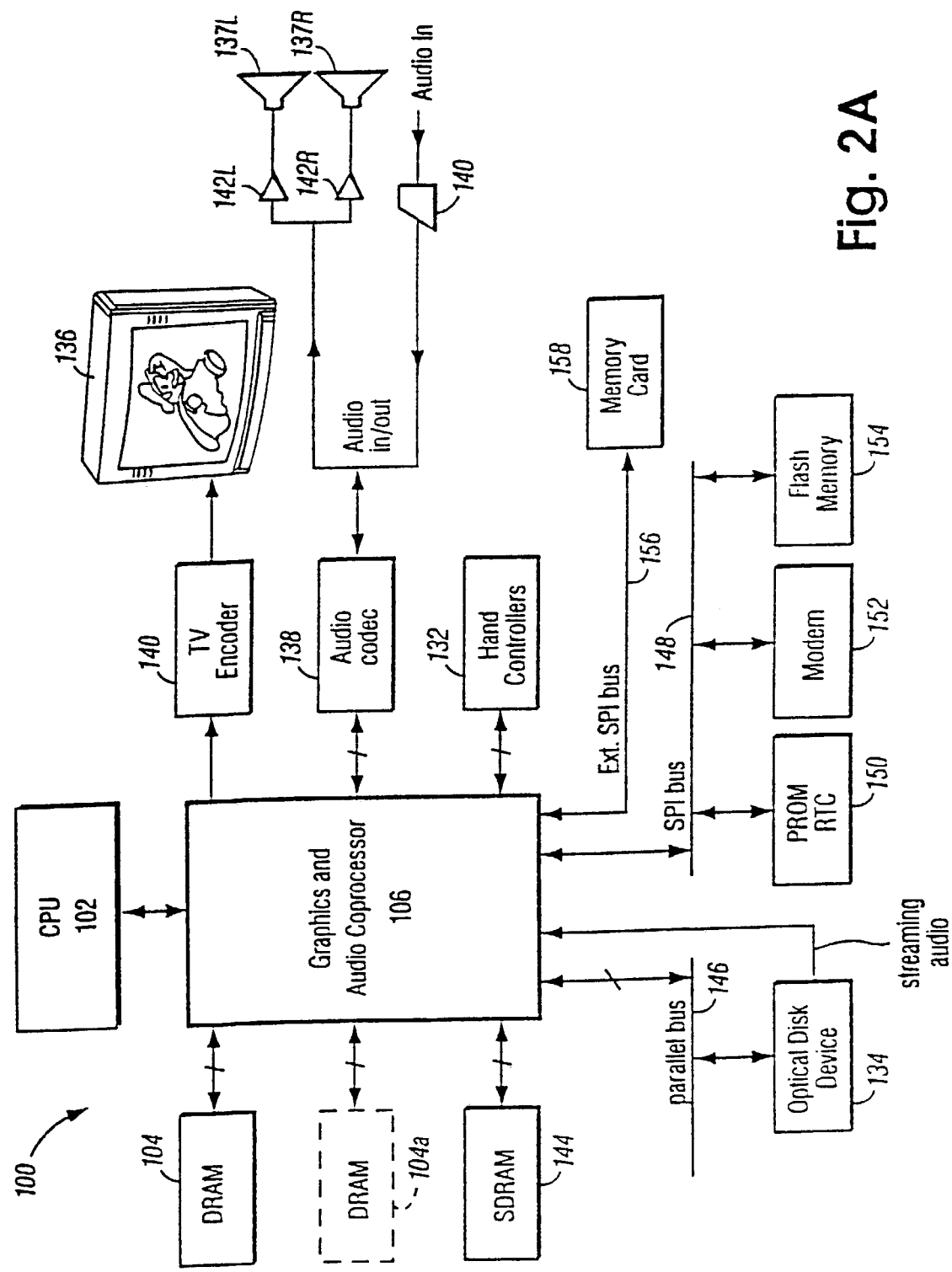
FIGS. 2A–2C show an example overall 3D interactive computer graphics system in which the present invention may be employed.

FIG. 2A is a schematic diagram of an overall example interactive 3D computer graphics system 100 in which the present invention may be practiced. System 100 can be used to play interactive 3D video games accompanied by interesting stereo sound. Different games can be played by inserting appropriate storage media such as optical disks into an optical disk player 134. A game player can interact with system 100 in real time by manipulating input devices such as handheld controllers 132, which may include a variety of controls such as joysticks, buttons, switches, keyboards or keypads, etc.

System 100 includes a main processor (CPU) 102, a main memory 104, and a graphics and audio coprocessor 106. In this example, main processor 102 receives inputs from handheld controllers 132 (and/or other input devices) via coprocessor 100. Main processor 102 interactively responds to such user inputs, and executes a video game or other graphics program supplied, for example, by external storage 134. For example, main processor 102 can perform collision detection and animation processing in addition to a variety of real time interactive control functions.

Main processor 102 generates 3D graphics and audio commands and sends them to graphics and audio coprocessor 106. The graphics and audio coprocessor 106 processes these commands to generate interesting visual images on a display 136 and stereo sounds on stereo loudspeakers 137R, 137L or other suitable sound-generating devices.

System 100 includes a TV encoder 140 that receives image signals from coprocessor 100 and converts the image signals into composite video signals suitable for display on a standard display device 136 (e.g., a computer monitor or home color television set). System 100 also includes an audio codec (compressor/decompression) 138 that compresses and decompresses digitized audio signals (and may also convert between digital and analog audio signaling formats). Audio codec 138 can receive audio inputs via a buffer 140 and provide them to coprocessor 106 for processing (e.g., mixing with other audio signals the coprocessor generates and/or receives via a streaming audio output of optical disk device 134). Coprocessor 106 stores audio related information in a memory 144 that is dedicated to audio tasks. Coprocessor 106 provides the resulting audio output signals to audio codec 138 for decompression and conversion to analog signals (e.g., via buffer amplifiers 142L, 142R) so they can be played by speakers 137L, 137R.

Coprocessor 106 has the ability to communicate with various peripherals that may be present within system 100. For example, a parallel digital bus 146 may be used to communicate with optical disk device 134. A serial peripheral bus 148 may communicate with a variety of peripherals including, for example, a ROM and/or real time clock 150, a modem 152, and flash memory 154. A further external serial bus 156 may be used to communicate with additional expansion memory 158 (e.g., a memory card).

Graphics and Audio Coprocessor

Figure 2B:
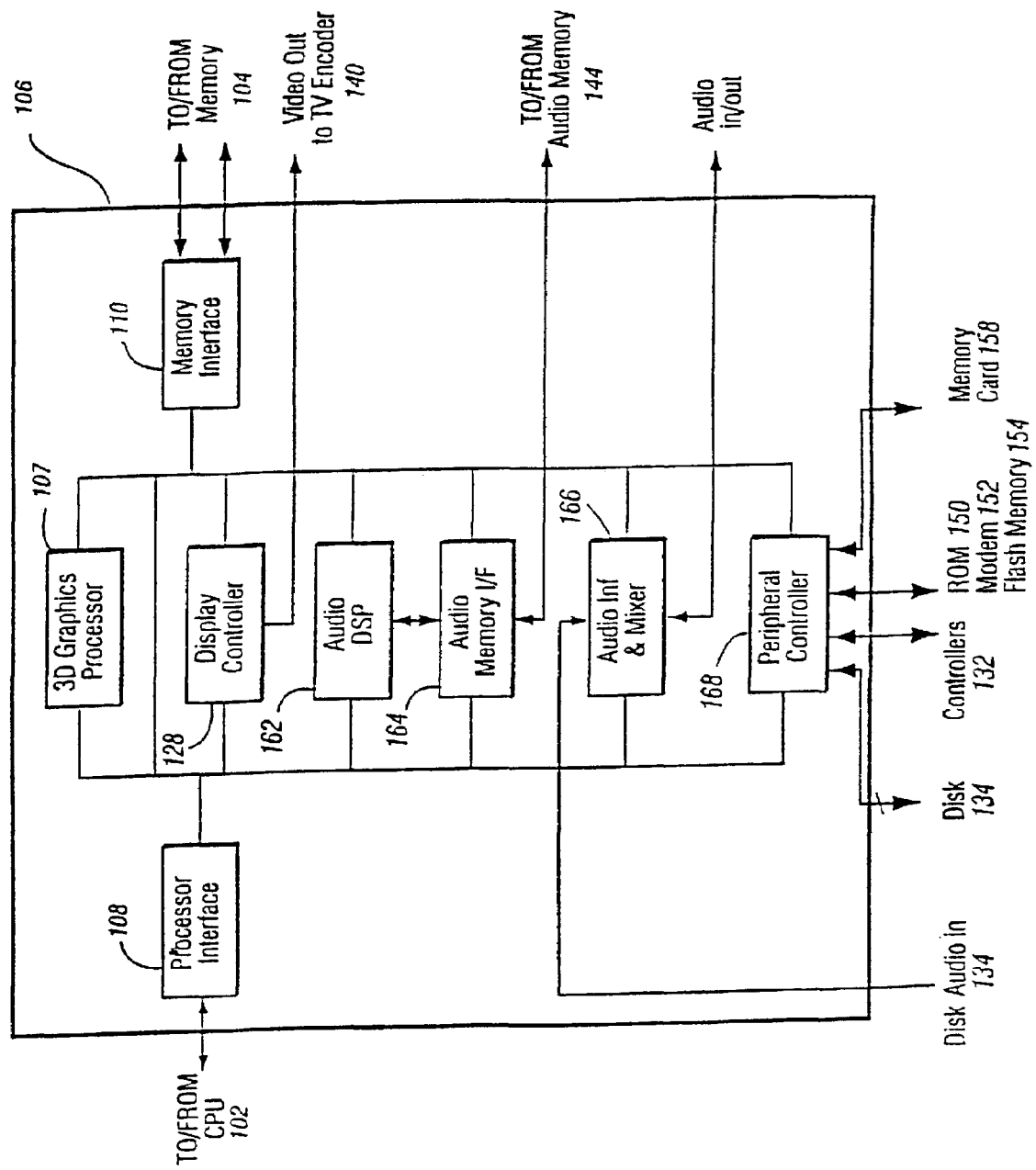

FIG. 2B is a block diagram of components within coprocessor 106. Coprocessor 106 may be a single ASIC (application specific integrated circuit). In this example, coprocessor 106 includes a 3D graphics processor 107, a processor interface 108, a memory interface 110, an audio digital signal processor (DSP) 162, an audio memory interface (I/F) 164, an audio interface and mixer 166, a peripheral controller 168, and a display controller 128.

3D graphics processor 107 performs graphics processing tasks, and audio digital signal processor 162 performs audio processing tasks. Display controller 128 accesses image information from memory 104 and provides it to TV encoder 140 for display on display device 136. Audio interface and mixer 166 interfaces with audio codec 138, and can also mix audio from different sources (e.g., a streaming audio input from disk 134, the output of audio DSP 162, and external audio input received via audio codec 138). Processor interface 108 provides a data and control interface between main processor 102 and coprocessor 106. Memory interface 110 provides a data and control interface between coprocessor 106 and memory 104. In this example, main processor 102 accesses main memory 104 via processor interface 108 and memory controller 110 that are part of coprocessor 106. Peripheral controller 168 provides a data and control interface between coprocessor 106 and the various peripherals mentioned above (e.g., optical disk device 134, controllers 132, ROM and/or real time clock 150, modem 152, flash memory 154, and memory card 158). Audio memory interface 164 provides an interface with audio memory 144.

Figure 2C:
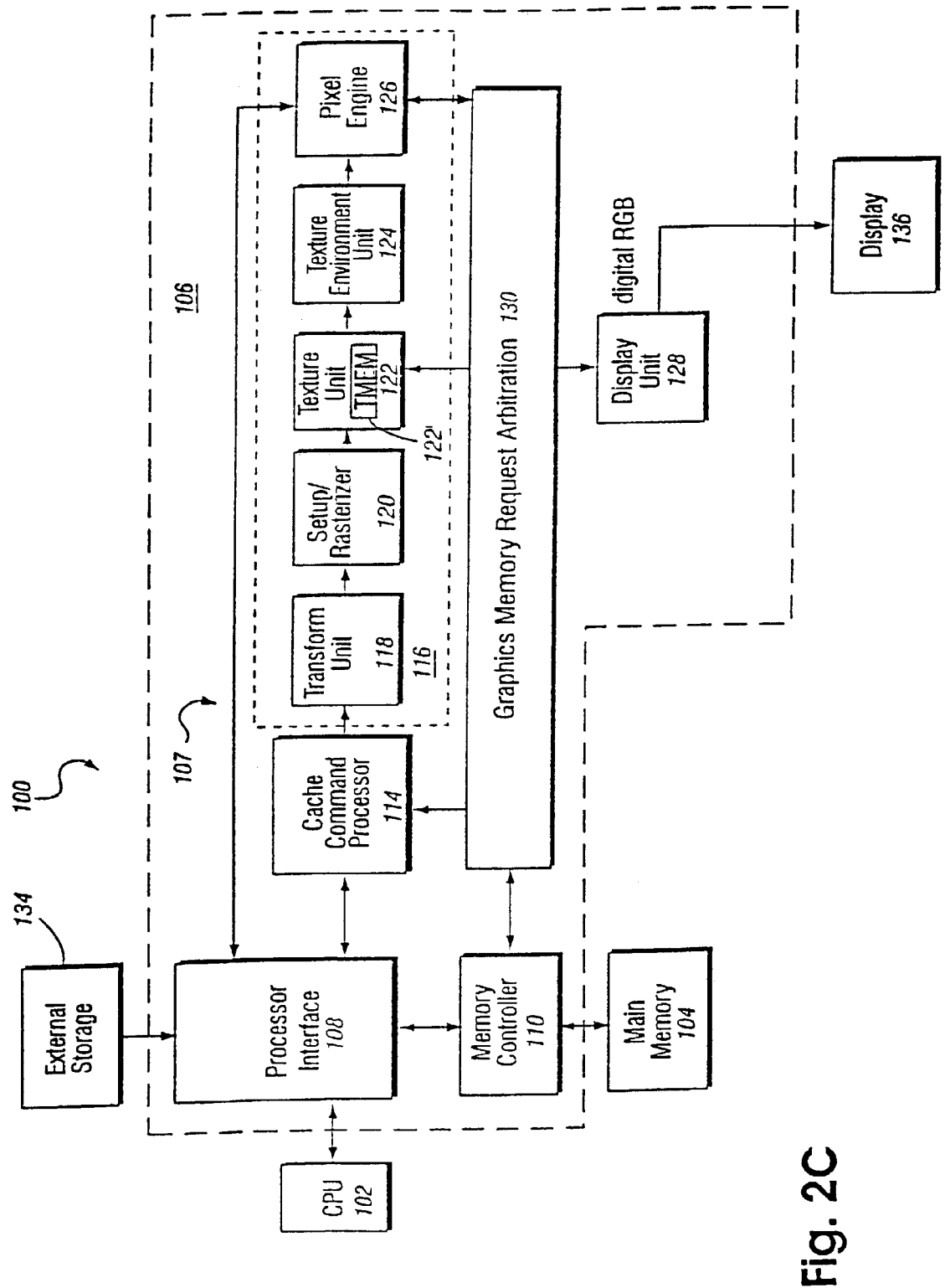

FIG. 2C shows a more detailed view of 3D graphics processor 107 and associated components within coprocessor 106. 3D graphics processor 107 includes a command processor 114 and a 3D graphics pipeline 116. Main processor 102 communicates streams of graphics data (i.e., display lists) to command processor 114. Command processor 114 receives these display commands and parses them (obtaining any additional data necessary to process them from memory 104), and provides a stream of vertex commands to graphics pipeline 116 for 3D processing and rendering. Graphics pipeline 116 generates a 3D image based on these commands. The resulting image information may be transferred to main memory 104 for access by display controller 128—which displays the frame buffer output of pipeline 116 on display 136.

In more detail, main processor 102 may store display lists in main memory 104, and pass pointers to command processor 114 via bus interface 108. The command processor 114 fetches the command stream from CPU 102, fetches vertex attributes from the command stream and/or from vertex arrays in memory, converts attribute types to floating point format, and passes the resulting complete vertex polygon data to the graphics pipeline 116 for rendering/rasterization. A memory arbitration circuitry 130 arbitrates memory access between graphics pipeline 116, command processor 114 and display unit 128.

As shown in FIG. 2C, graphics pipeline 116 may include transform unit 118, a setup/rasterizer 120, a texture unit 122, a texture environment unit 124 and a pixel engine 126. In graphics pipeline 116, transform unit 118 performs a variety of 3D transform operations, and may also perform lighting and texture effects. For example, transform unit 118 transforms incoming geometry per vertex from object space to screen space; transforms incoming texture coordinates and computes projective texture coordinates; performs polygon clipping; performs per vertex lighting computations; and performs bump mapping texture coordinate generation. Set up/rasterizer 120 includes a set up unit which receives vertex data from the transform unit 118 and sends triangle set up information to rasterizers performing edge rasterization, texture coordinate rasterization and color rasterization. Texture unit 122 (which may include an on-chip texture memory 122') performs various tasks related to texturing, including multi-texture handling, post-cache texture decompression, texture filtering, embossed bump mapping, shadows and lighting through the use of projective textures, and BLIT with alpha transparency and depth. Texture unit 122 outputs filtered texture values to the texture environment unit 124. Texture environment unit 124 blends the polygon color and texture color together, performing texture fog and other environment-related functions.

Pixel engine 126 performs z buffering and blending, and stores data into an on-chip frame buffer memory. Graphics pipeline 116 may include one or more embedded DRAM memories to store frame buffer and/or texture information locally. The on-chip frame buffer is periodically written to main memory 104 for access by display unit 128. The frame buffer output of graphics pipeline 116 (which is ultimately stored in main memory 104) is read each frame by display unit 128. Display unit 128 provides digital RGB pixel values for display on display 136.

Example Variable Bit Encoding Format

FIGS. 3A and 3B show an example image element variable bit encoding format. In the particular example shown, the format has a fixed length of 16 bits, but how those bits are allocated can vary on an instance-by-instance basis such that the same image map can use different encodings for different elements. In more detail, when the most significant bit (bit 15) is set, the remainder of the format encodes higher resolution color information (for example, five bits each of red, green and blue color values) and defines an opaque image element. When the most significant bit is not set, the format provides lower resolution color information (for example, four bits each of red, green and blue) along with three bits of alpha information defining multiple levels of semi-transparency.

In more detail, the image element formats shown in FIGS. 3A and 3B may be among one of several different format options for the texture unit 122. Other texture formats may include, for example:

sixteen-bit RGB (5 bits of red, 6 bits of green and 5 bits of blue), thirty-two bit RGBA (8 bits of each red, green, blue and alpha), four-bit intensity, eight-bit intensity, four-bit intensity and four-bit alpha, eight-bit intensity and eight-bit alpha, and various color indexed modes The format shown in FIGS. 3A and 3B may be selected, for example, by specifying a format parameter in a graphics command directed to texture unit 122 for initializing a new texture object. Any given texture mapping will generally have a single overall format—but in this particular example, the two alternate formats shown in FIGS. 3A and 3B are both encompassed by the same format parameter. The most significant bit (bit 15) within the format encoding specifies whether the particular instance of the format contains five bits each of red, green and blue information (RGB5); or alternatively, four bits each of red, green and blue plus three bits of alpha (RGB4A3).

Referring now specifically to FIG. 3A, the most significant ("flag") bit 302 is set to 1, indicating an opaque, higher color resolution encoding. In the particular example shown, the encoding in this case comprises a total of sixteen bits, with:

bit positions 14-11 occupied by a five-bit red color field 304;

bit positions 9-5 occupied by a five-bit green color field 306; and bit positions 4-0 occupied by a five-bit blue color field 308.

In FIG. 3B, in contrast, the flag 302 is set to 0 to indicate that the remaining 15 bits of that instance of the format encode lower resolution color information and a multi-bit alpha value. In this particular instance example:

a three-bit alpha field 310 occupies bit positions 14-12;

a four-bit red color field 312 occupies bit positions 11-8;

a four-bit green color field 314 occupies bit positions 7-4; and a 4-bit blue color field 316 occupies bit positions 3-0.

Figure 4:
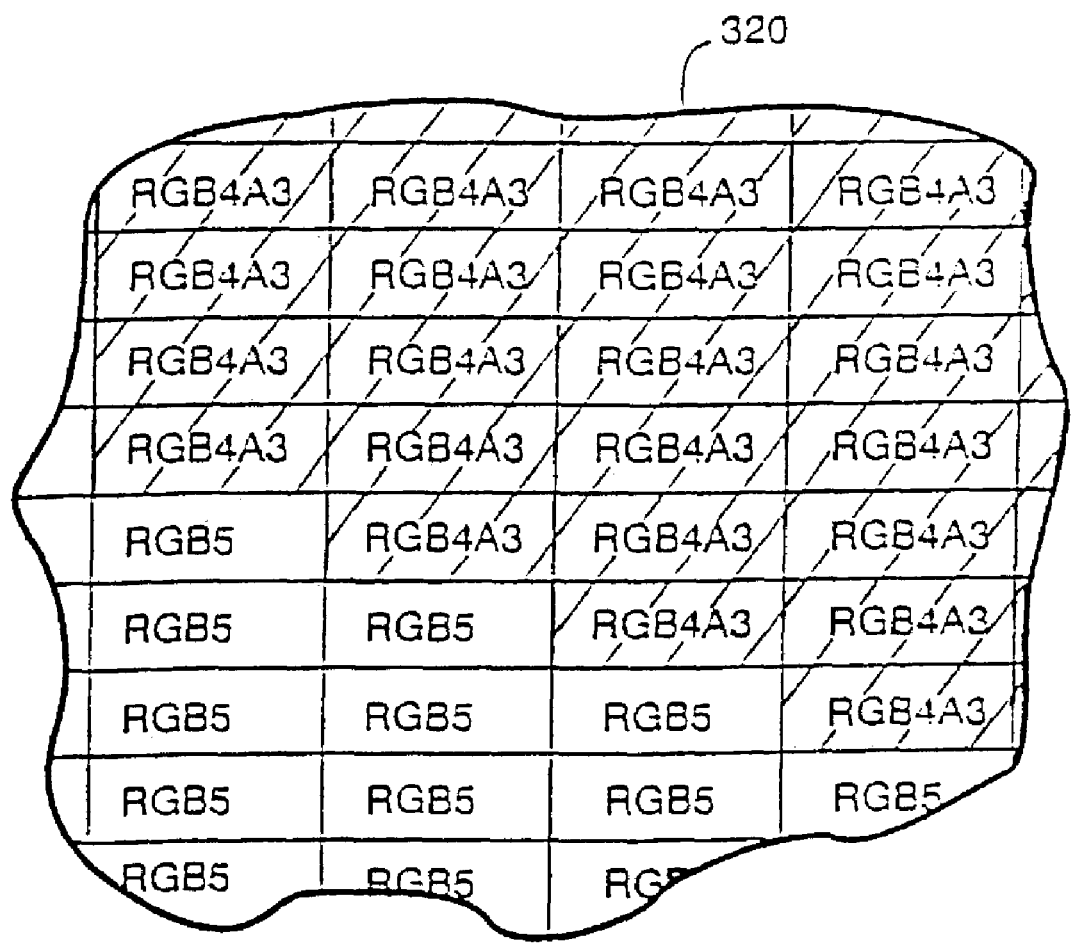
FIG. 4 shows an example texture memory map using the variable bit encoding format of FIGS. 3A and 3B.

FIG. 4 shows an example portion of a texture map 320 stored in texture memory 122' using the variable bit format encoding scheme shown in FIGS. 3A and 3B. FIG. 4 shows that different texels within the same texture map can have different ones of the encodings shown in FIGS. 3A and 3B. For example, certain texels along an edge of a cutout or the like requiring semi-transparency may be encoded using the FIG. 3B format—as indicated by the shaded texels shown in FIG. 4. Other texels within the same texture map that are opaque as opposed to semi-transparent or transparent may use the FIG. 3A encoding with higher color resolution and no transparency value—as indicated by the unshaded elements of FIG. 4. Of course, it would be possible to represent the entire texture map using either the FIG. 3A format or the FIG. 3B format if desired for uniformity or other reasons. The FIG. 3B encoding in this example is capable of representing opaque texels (e.g., by setting the alpha field 310 to its maximum) or completely transparent texels (e.g., by setting alpha field 310 to its minimum value). However, if no texels are transparent or semi-transparent, then it might be preferable to use a different format without a flag field 302 (e.g., the RGB 565 field discussed above) to maximize memory usage efficiency.

Conversion Between Alpha Resolutions

One issue that arises when using the FIG. 3B format is how to map or convert between higher resolution color and/or alpha component values and the lower resolution color and/or alpha component values shown in FIG. 3B. As an example, the graphics pipeline shown in FIG. 2C may provide eight-bit resolution for each of the red, green, blue and alpha channels. These 8-bit component values may need to be compatible with the reduced resolution color and alpha information within the FIGS. 3A/3B encoding. Similarly, the frame buffer may be capable of storing image elements in higher resolution formats (e.g., 24-bit or 32-bit RGBA words), and it may be possible or desirable to generate texture maps by copying image elements from the frame buffer to texture memory 122'. To accommodate such conversions, the example embodiment provides multiplexing and demultiplexing logic to map or convert between the lower resolution values shown in FIG. 3B and the higher resolution values such as, for example, eight bits each of RGBA. Many different mappings are possible, but the one we prefer for alpha is to provide eight evenly-spaced quantization levels as shown in FIG. 5. A different number of quantization levels (e.g., nine) would also work, but for ease of use and compatibility with other formats, it may be most convenient to use eight levels as oppose to some other number. The following table shows an example mapping using eight equally spaced quantized levels:

TABLE I

| A [7:0] | S | A [2:0] | Actual Value | Delta |
|---|---|---|---|---|
| 0 . . . 31 | 32 | 0/7 | 0 | |
| 32 . . . 63 | 32 | 1/7 | 36 | 36 |
| 64 . . . 95 | 32 | 2/7 | 73 | 37+ |
| 96 . . . 127 | 32 | 3/7 | 109 | 36 |

TABLE I-continued

| A [7:0] | S | A [2:0] | Actual Value | Delta |
|---|---|---|---|---|
| 128 . . . 159 | 32 | 4/7 | 146 | 37+ |
| 160 . . . 191 | 32 | 5/7 | 182 | 36 |
| 192 . . . 223 | 32 | 6/7 | 219 | 37+ |
| 224 . . . 255 | 32 | 7/7 | 255 | 36 |

As shown in the above table, "S" represents the size of the range that maps to one quantized representation. In this example, all range sizes are equal because the quantized levels are equally spaced. The "delta" value D is the difference between dequantized values, with a "+" denoting a delta which is "high."

FIG. 6 shows an example texel component extraction multiplexing technique provided to perform the mapping of FIG. 5 and Table I. The FIG. 6 multiplexing technique takes the FIG. 3B format and maps it into eight bits each of alpha, red, green and blue. In this example, the mapping is performed in a straightforward fashion by simply repeating extracting bit patterns from the FIG. 3B format, that is:

| format | Texel alpha [7:0] | Texel red [7:0] | Texel green [7:0] | Texel blue [7:0] |
|---|---|---|---|---|
| 0/A3/R4/G4/B4 | [14:12] [14:12]] [14:13] | [11:8] [11:8] | [7:4] [7:4] | [3:0] [3:0] |

While the invention has been described in connection with what is presently considered to be the most practical and preferred embodiment, it is to be understood that the invention is not to be limited to the disclosed embodiment. For example, the particular number of bits and/or the order of the bits described above could change depending upon the application. In addition, the variable bit encoding described above could be used as part of a color indexed value if desired. Also, the disclosed embodiment relates to a texture map encoding format, but the invention is not limited to texture representations. For example, pixels or other data items could benefit from the encoding provided by this invention. In addition, the applications provided by this invention are not limited by any means to generation of cutouts and trim surfaces. On the contrary, the invention is intended to cover various modifications and equivalent arrangements included within the scope of the appended claims.

What is claimed is:

1. A texture map comprising plural differently formatted texels, said texture map providing different color resolutions at different points of the image said texture map represents, said texture map including:
   at least a first texel encoded with a semi-transparency value and having first color resolution; and
   at least a second texel encoded without any semi-transparency value and having second color resolution greater than said first color resolution,
   wherein said first and second texels having different color resolutions are included within the same texture map and each contribute to the same texture image.

2. A texture map as in claim 1 wherein said first and second texels each further include a flag indicating whether said texel is encoded with a multi-bit semi-transparency value and provides said first color resolution, or whether said texel is encoded without any semi-transparency value and provides said second color resolution greater than said first color resolution.

3. The texture map of claim 1 wherein said first texel and said second texel provide the same number of encoding bits.

4. The texture map of claim 3 wherein said number of encoding bits is 16.

5. A method of generating a cutout image within a 3D graphics system having a 3D graphics pipeline that generates images based on polygons, said graphics pipeline including a texture mapping unit storing a texture map including a first set of semi-transparent colored texels, and a second set of opaque, colored texels, said first and second sets of texels each contributing to the same texture image, said method comprising:

encoding each of said texels in a variable bit encoding format wherein a predetermined bit field within said format is allocated to encode semi-transparency of said first set of texels, and said same predetermined bit field is allocated to encode coloration of said second set of texels within the same texture imane;

applying said texel encoding as a matte to a polygon using at least one alpha operation, to generate a set of image elements, different image elements having different dynamic color ranges due to the different use of said predetermined bit field in different ones of said texels representing said matte; and anti-aliasing said image elements.

6. The method of claim 5 wherein each texel within said first texel set has the same number of bits as each texel within said second texel set.

7. The method of claim 6 wherein said number of bits is 16.

* * * * *